(12) United States Patent
Ishii et al.

(10) Patent No.: US 10,165,371 B2
(45) Date of Patent: Dec. 25, 2018

(54) ELECTRONIC DEVICE

(71) Applicant: TAIYO YUDEN CO., LTD., Taito-ku, Tokyo (JP)

(72) Inventors: Shigeo Ishii, Takasaki (JP); Yukihiro Matsui, Takasaki (JP); Hiroshi Hamada, Takasaki (JP); Keiichi Kobayashi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/513,136

(22) PCT Filed: Sep. 30, 2015

(86) PCT No.: PCT/JP2015/077648
§ 371 (c)(1),
(2) Date: Mar. 21, 2017

(87) PCT Pub. No.: WO2016/052582
PCT Pub. Date: Apr. 7, 2016

(65) Prior Publication Data
US 2017/0311086 A1    Oct. 26, 2017

(30) Foreign Application Priority Data

Sep. 30, 2014  (JP) .................................. 2014-200004

(51) Int. Cl.
*H04R 17/00* (2006.01)
*H04R 7/04* (2006.01)
(Continued)

(52) U.S. Cl.
CPC .............. *H04R 17/00* (2013.01); *H04M 1/03* (2013.01); *H04R 1/025* (2013.01); *H04R 7/04* (2013.01);
(Continued)

(58) Field of Classification Search
CPC .......... H04R 17/00; H04R 1/025; H04R 7/04; H04M 1/035; H04M 1/6016
(Continued)

(56) References Cited

U.S. PATENT DOCUMENTS 6,741,710 B1 *   5/2004   Takeshima ............... H04R 1/06
                                                                381/190
8,279,623 B2 *  10/2012   Idzik ........................ B06B 1/00
                                                                310/348
(Continued)

FOREIGN PATENT DOCUMENTS

JP         2005175553 A     6/2005
JP            5255142 B1    4/2013
(Continued)

OTHER PUBLICATIONS

International Search Report (ISR) dated Nov. 10, 2015, issued for International application No. PCT/JP2015/077648.

*Primary Examiner* — Oyesola C Ojo
(74) *Attorney, Agent, or Firm* — Law Office of Katsuhiro Arai

(57) ABSTRACT

In an embodiment, an electronic device 1 has a panel 20, a housing 10 that holds the panel 20, and a piezoelectric element 30 installed on the rear side of the panel 20, wherein the piezoelectric element 30 is installed at a position that allows for the vibration amplitude of the panel 20 to become the highest on the side closer to the center of the panel 20 in the longitudinal direction from the installed position of the piezoelectric element 30. The electronic device is capable of causing an entire panel to vibrate in a stable manner.

4 Claims, 6 Drawing Sheets

(51) Int. Cl.
  *H04R 1/02* (2006.01)
  *H04M 1/03* (2006.01)
  *H04M 1/60* (2006.01)
(52) U.S. Cl.
  CPC .............. *H04R 7/045* (2013.01); *H04M 1/035* (2013.01); *H04M 1/6016* (2013.01); *H04R 2307/201* (2013.01); *H04R 2400/03* (2013.01); *H04R 2440/05* (2013.01); *H04R 2499/11* (2013.01); *H04R 2499/15* (2013.01)
(58) Field of Classification Search
  USPC .......................................................... 381/190
  See application file for complete search history.

(56) References Cited

U.S. PATENT DOCUMENTS 9,888,323 B2 * 2/2018 Kanemaki ............... H04M 1/03
2006/0093165 A1 * 5/2006 Kamimura ............. H04R 7/045
  381/152
2006/0140424 A1 * 6/2006 Kobayashi ............. H04R 7/045
  381/190
2006/0227981 A1 10/2006 Miyata
2007/0189560 A1 * 8/2007 Uenishi .................. H04R 17/00
  381/191
2009/0103767 A1 * 4/2009 Kuroda ................... H04M 1/03
  381/388
2010/0225600 A1 * 9/2010 Dai ........................ G06F 3/016
  345/173
2015/0023531 A1 * 1/2015 Horii ..................... H04M 1/026
  381/190
2015/0256656 A1 * 9/2015 Horii ...................... H04M 1/03
  455/575.1

FOREIGN PATENT DOCUMENTS

JP       2013207796 A    10/2013
WO       2004023199 A1   3/2004

* cited by examiner

[FIG. 1]
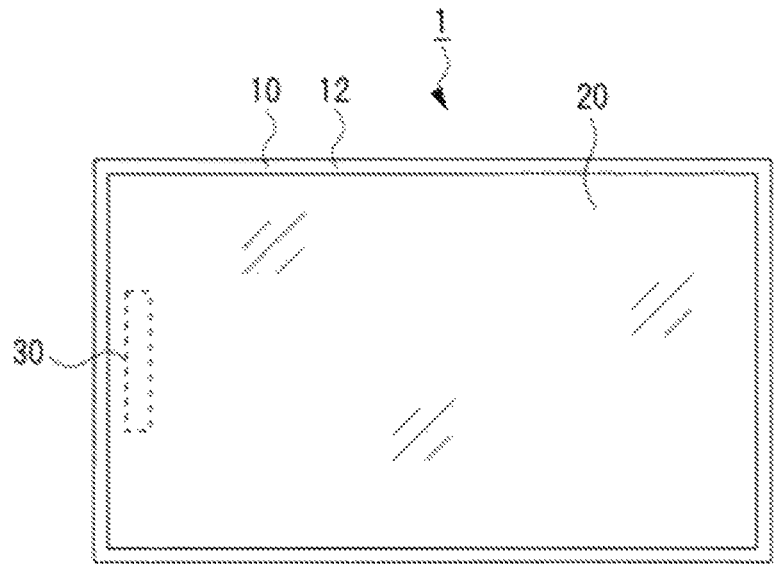
[FIG. 2]
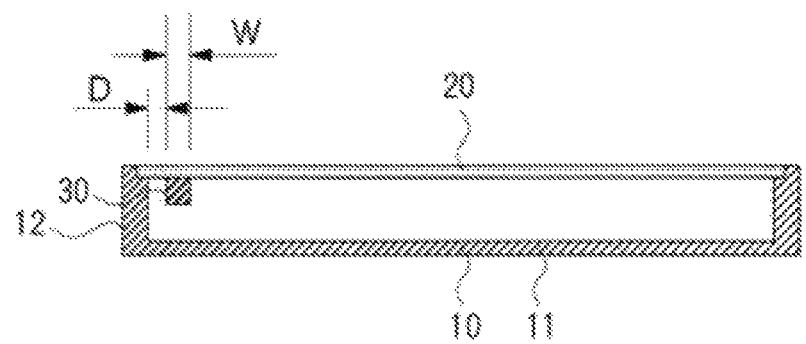

[FIG. 3]
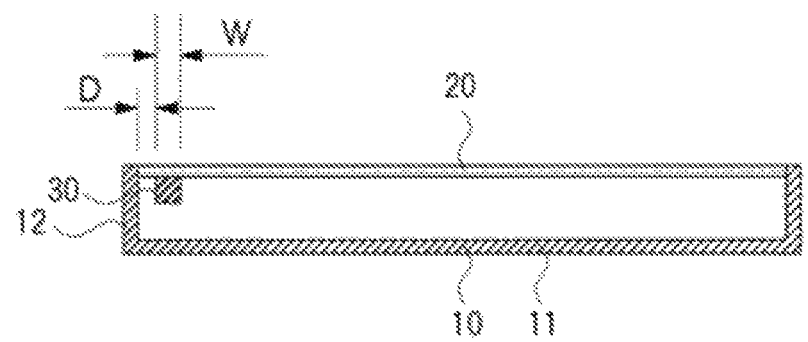
[FIG. 4]
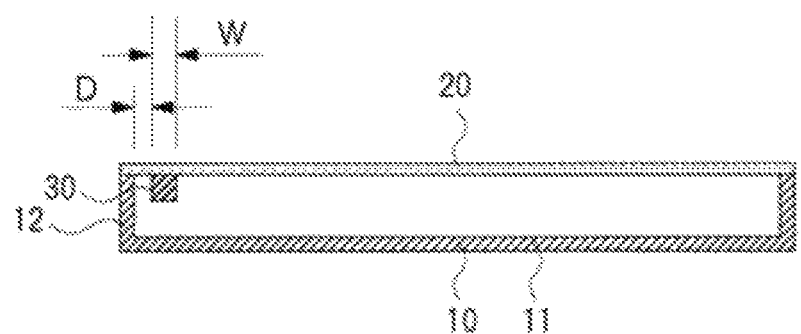

[FIG. 5]
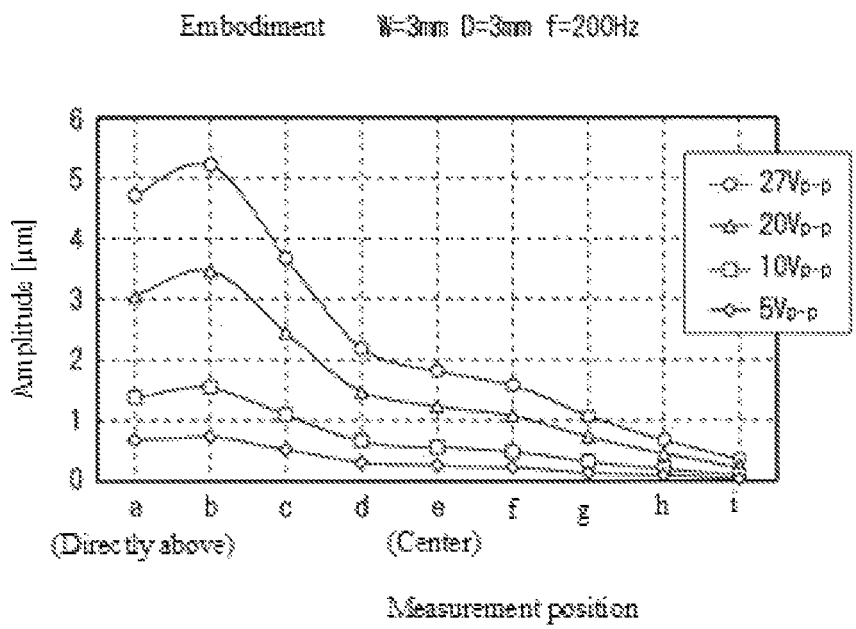
[FIG. 6]
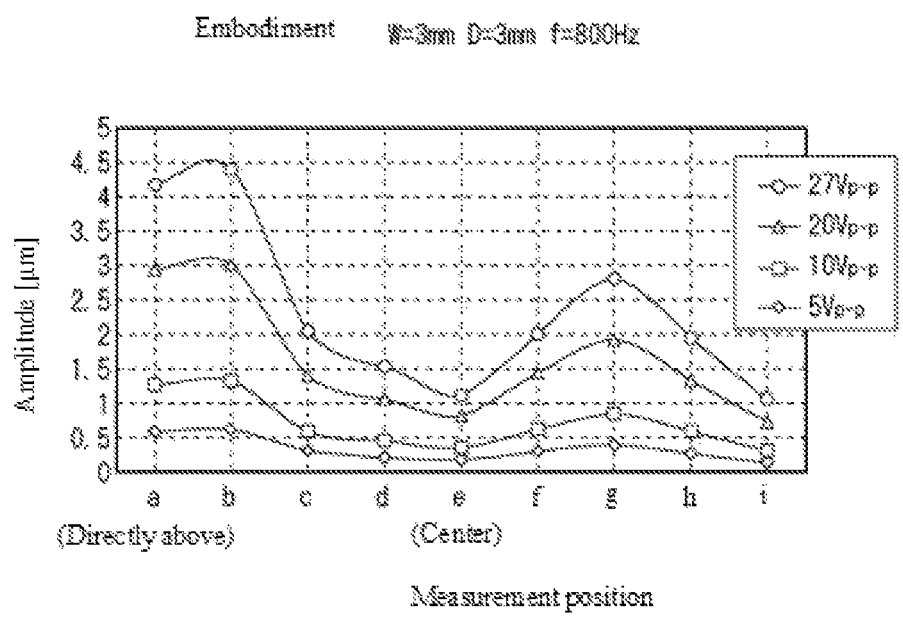

[FIG. 7]
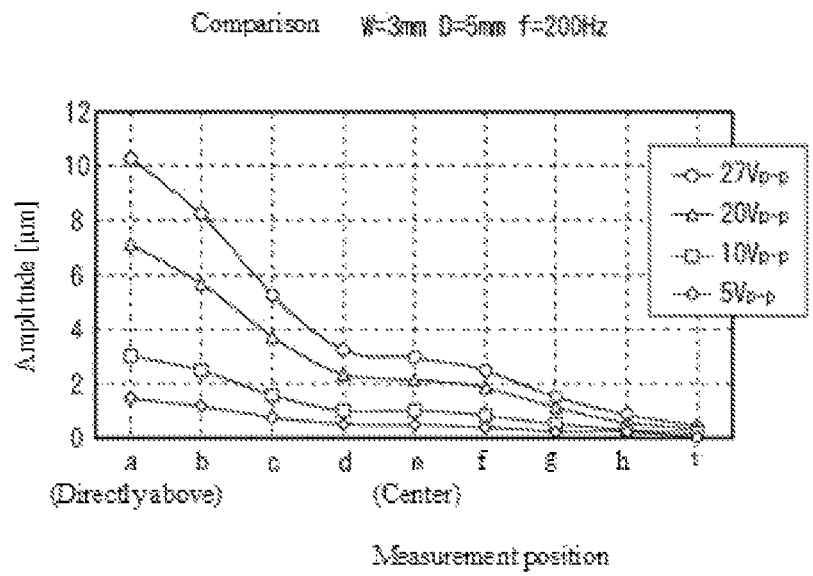
[FIG. 8]
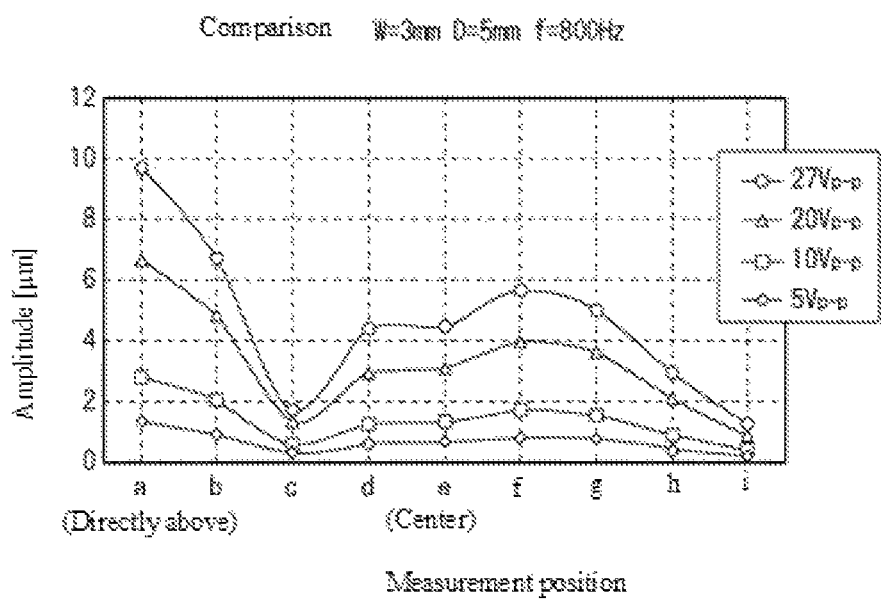

[FIG. 9]
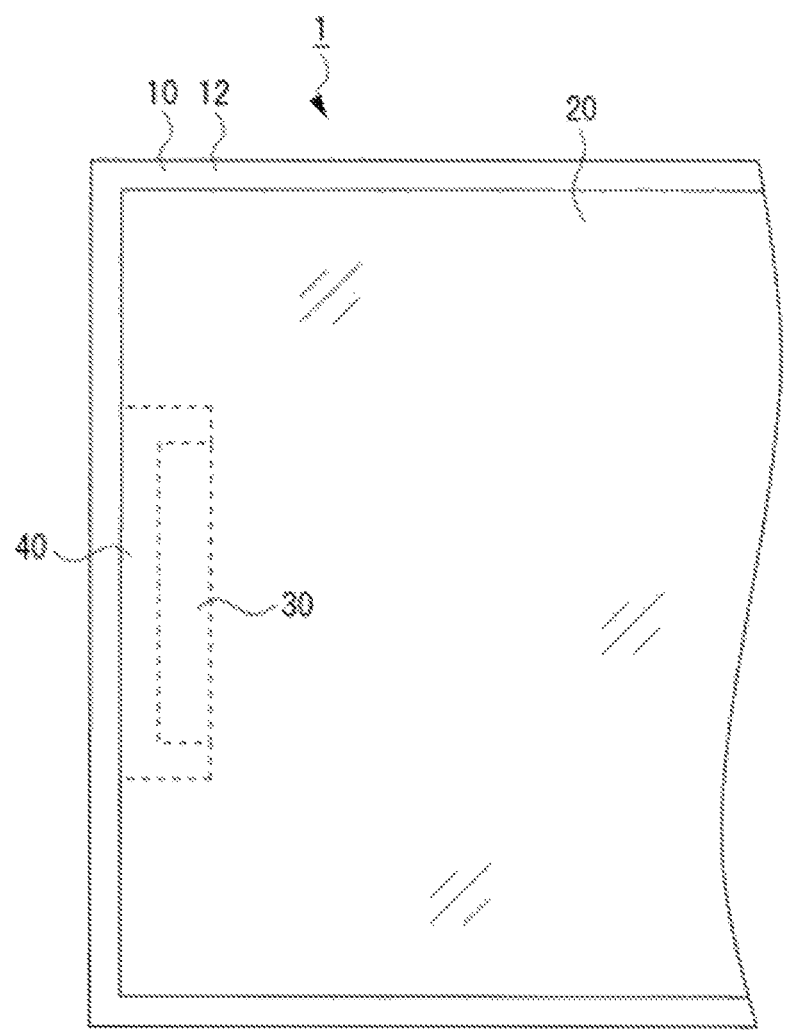

[FIG. 10]
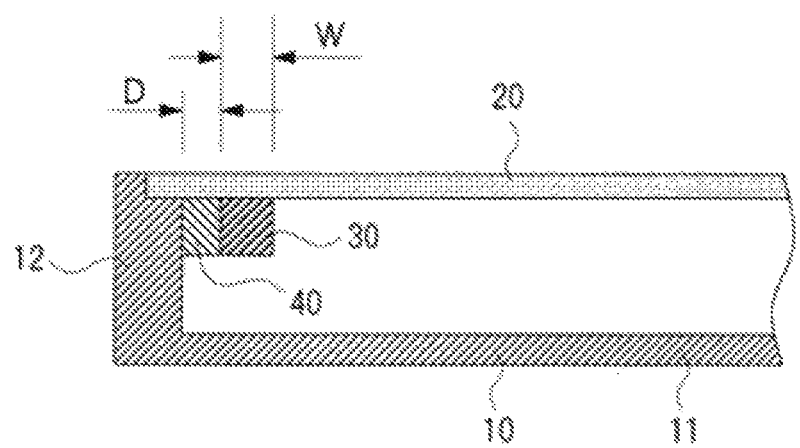

ELECTRONIC DEVICE

This application is the U.S. National Phase under 35 U.S.C. § 371 of International Application PCT/JP2015/077648, filed Sep. 30, 2015, which claims priority to Japanese Patent Application No. 2014-200004, filed Sep. 30, 2014. The International Application was published under PCT Article 21(2) in a language other than English.

TECHNICAL FIELD

The present invention relates to an electronic device with piezoelectric element.

BACKGROUND ART

Traditionally, multi-functional mobile communication terminals and other electronic devices commonly known as mobile phones and smartphones use piezoelectric elements called "piezoelectric speakers" as sounding elements for audio output. With traditional electronic devices, a piezoelectric element is placed inside the housing, and the housing has sound-passing holes to transmit sound to the outside by means of air conduction. On the other hand, technology has been proposed in recent years, whereby sound is transmitted by installing a piezoelectric element on the rear side of a panel placed on the principle face of the housing, and then causing the panel to vibrate. Behind the proposal of such technology are various needs, such as a need to eliminate sound-passing holes so as to enhance waterproof property, a need to transmit sound not only by means of air conduction using air as the medium, but also by means of bone conduction, and a need to implement haptic technology that transmits vibration of a panel to the user tactually. Here, a "panel" means a touch panel that only has touch function and no display function, a touch panel that has both display function and touch function, or protective panel designed to protect a liquid crystal display or other separate display.

One traditional electronic device adopting such technology is described in Patent Literature 1. The electronic device described in Patent Literature 1 has a housing, a panel of roughly rectangular shape whose edges are supported in the housing, and a piezoelectric element of roughly rectangular solid shape installed on the rear side of the panel. The piezoelectric element is installed in such a way that its longitudinal direction crosses at right angles with the longitudinal direction of the panel, and in particular, it is positioned in such a way that the vibration amplitude of the panel becomes the highest at the installed position of the piezoelectric element. To be specific, the piezoelectric element is installed at a position near one end of the panel in the longitudinal direction.

BACKGROUND ART LITERATURE

Patent Literature

Patent Literature 1: Japanese Patent No. 5255142

SUMMARY OF THE INVENTION

Problems to be Solved by the Invention

With the electronic device described in Patent Literature 1 above, however, the piezoelectric element is installed near the end of the panel in such a way that the vibration amplitude of the panel becomes the highest at this installed position, which means that points of high sound pressures from air-conducted sound concentrate only near the end of the panel, and consequently sound pressures become low near the center in particular. This presents a problem in that, when the electronic device is used in a phone or other equipment used in direct contact with the ear, sound is difficult to hear unless the ear contacts the device at a precise position. Another problem is that, in the case of an audio speaker, etc., where the electronic device is used away from the ear, not in direct contact with the ear, sound quality becomes unstable. Furthermore, when the piezoelectric element is used as a form of haptic technology, the vibration amount varies significantly between the end and center of the panel, which presents the problem of the user not receiving stable tactile sensations depending on the position.

The present invention was developed in light of the aforementioned situation, and its object is to provide an electronic device capable of causing an entire panel to vibrate in a stable manner.

Means for Solving the Problems

To achieve the aforementioned object, the invention pertaining to the present application for patent is an electronic device having a panel, a housing that holds the panel, and a piezoelectric element installed on the rear side of the panel, wherein such electronic device is characterized in that the piezoelectric element is installed at a position that allows for the vibration amplitude of the panel to become the highest on the side closer to the center of the panel in the longitudinal direction from the installed position of the piezoelectric element.

According to the present invention, the vibration amplitude of the panel becomes the highest on the center side offset from the installed position of the piezoelectric element, which allows the entire panel to vibrate in a stable manner.

One preferable embodiment of the present invention is one characterized in that the housing holds the panel at the edges of the panel, the longitudinal direction of the piezoelectric element crosses at right angles with the longitudinal direction of the panel, and the distance between the side face of the piezoelectric element opposite the side on which the position where the vibration amplitude of the panel becomes the highest, and the interior face of the housing facing said side face, is equal to or less than the width of the piezoelectric element.

Another preferable embodiment of the present invention is one characterized in that an auxiliary member is installed on the rear side of the panel between the side face of the piezoelectric element opposite the side on which the position where the vibration amplitude of the panel becomes the highest, and the interior face of the housing facing said side face. Here, one side face of the auxiliary member may be in contact with the interior face of the housing, while the other side face of the auxiliary member may be apart from the piezoelectric element, or alternatively the other side face of the auxiliary member may be in contact with the side face of the piezoelectric element.

Effects of the Invention

As described above, according to the present invention the vibration amplitude of the panel becomes the highest on the center side offset from the installed position of the piezoelectric element, allowing the entire panel to vibrate in a stable manner.

BRIEF DESCRIPTION OF THE DRAWINGS

FIG. 1 Schematic top view of the electronic device pertaining to the first embodiment.

FIG. 2 Section view of the electronic device pertaining to the first embodiment.

FIG. 3 Section view of an electronic device pertaining to a variation example of the first embodiment.

FIG. 4 Section view of an electronic device pertaining to a variation example of the first embodiment.

FIG. 5 Graph of measured vibration amplitudes of the panel in the electronic device pertaining to the first embodiment.

FIG. 6 Graph of measured vibration amplitudes of the panel in the electronic device pertaining to the first embodiment.

FIG. 7 Graph of measured vibration amplitudes of the panel in a comparison electronic device.

FIG. 8 Graph of measured vibration amplitudes of the panel in a comparison electronic device.

FIG. 9 Schematic top view of the electronic device pertaining to the second embodiment.

FIG. 10 Section view of the electronic device pertaining to the second embodiment.

MODE FOR CARRYING OUT THE INVENTION (First Embodiment)

The electronic device pertaining to the first embodiment of the present invention is explained by referring to the drawings. FIG. 1 is a schematic top view of the electronic device, while FIG. 2 is a section view of the electronic device. In this embodiment, a multi-functional mobile communication terminal, or so-called smartphone, is explained as an example of electronic device.

As shown in FIGS. 1 and 2, the electronic device 1 has a housing 10 of thin box shape with an open top face, a panel 20 that closes the open top face of the housing 10, and a piezoelectric element 30 installed on the rear side of the panel 20 or specifically the inner side of the housing 10.

The housing 10 has a thin box shape with an open top face, constituted by a bottom plate 11 and a frame 12 that surrounds the edges of the bottom plate. As shown in FIG. 2, a step that holds the edges of the panel 20 is formed on the top inner side of the frame 12. The depth of the step is roughly equal to the sum of the thickness of the panel 20 and the thickness of the adhesive member, so that the top face of the panel 20 becomes flush with the top face of the frame 12.

The panel 20 is a touch panel that has built-in touch function only to detect contact, a liquid crystal touch panel that has multiple built-in functions including touch function and display function such as a liquid crystal display, or a protective panel that does not have built-in touch function but only protects a liquid crystal display or other display placed in the housing 10. The panel 20 has a rectangular sheet-shaped member and, as shown in FIG. 2, the edges of the panel 20 are bonded to the step of the frame 12 of the housing 10 by means of adhesive, double-sided tape, etc. For the primary material of the panel 20, any of various materials may be used including glass and acrylic. The front side of the panel 20 may be flat or curved. It should be noted that a step need not be provided at the top of the frame 12 of the housing 10; instead, the edges of the rear side of the panel 20 may be bonded to the top face of the frame 12 of the housing 10, as shown in FIG. 3, or the periphery of the panel 20 may be bonded to the top interior face of the frame 12 of the housing 10, as shown in FIG. 4.

The piezoelectric element 30 has a roughly rectangular solid shape. For the piezoelectric element 30, any of the various types may be used including the bimorph type, unimorph type, and laminated type. In this embodiment, a laminated piezoelectric element was used. The piezoelectric element 30 is used to vibrate the panel 20 to transmit sound by means of air conduction or bone conduction, and also to transmit the vibration of the panel 20 tactually.

The piezoelectric element 30 is bonded with adhesive, double-sided tape, or other bonding member (not illustrated) on the rear side of the panel 20. The longitudinal direction of the piezoelectric element 30 crosses at right angles with the longitudinal direction of the panel 20, and its center in the longitudinal direction is positioned at the center of the panel 20 in the lateral direction. Under the present invention, the distance D between one side face of the piezoelectric element 30 and the interior face of the housing 10 facing this side face is equal to or less than the width W of the piezoelectric element 30. The present invention, based on this constitution, is characterized in that the position at which the vibration amplitude of the panel 20 surface due to the vibration of the piezoelectric element 30 becomes the highest is located not directly above the piezoelectric element 30, but it is located in the center direction of the panel 20 in the longitudinal direction, offset from the installed position of the piezoelectric element 30.

FIGS. 5 and 6 each show a graph of measured vibration amplitudes of the panel 20 of the electronic device 1 pertaining to this embodiment. Here, a piezoelectric element 30 of 3 mm in width, 28 mm in length, and 0.8 mm in thickness was used. The distance between the side face of the piezoelectric element 30 and the interior face of the housing 10 was set to 3 mm, meeting the requirement of being equal to or less than the width of the piezoelectric element 30. Also, for the panel 20, reinforced glass of 64 mm in length, 133 mm in width, and 0.55 mm in thickness was used. The width of the bonding area with the housing 10 along the edges of the panel 20 was set to 1 mm. Also, in FIGS. 5 and 6, sine-wave signals of 5 $V_{p-p}$, 10 $V_{p-p}$, 20 $V_{p-p}$, and 27 $V_{p-p}$ were input to the piezoelectric element 30, respectively, at a frequency of 200 Hz (for acoustic application) in the graph in FIGS. 5 and 800 Hz (for panel touch application) in the graph in FIG. 6.

In the graphs in FIGS. 5 and 6, the vertical axis represents the vibration amplitude [cm], while the horizontal axis represents the measurement position. There are a total of nine measurement positions including, along the center line of the panel 20 in the lateral direction, (a) directly above the piezoelectric element 30, (b) 5 mm offset to the center from the point directly above the piezoelectric element 30, (c) 10 mm offset to the center from that same point, (d) 35 mm offset to the center from that same point, (e) center of the panel 20 in the longitudinal direction, and (f) through (i) corresponding to the positions symmetrical to (a) through (d) where (e) represents the center.

Comparisons where the distance between the side face of the piezoelectric element 30 and the interior face of the housing 10 is set to 5 mm, which is greater than the width of the piezoelectric element 30, are shown in FIGS. 7 and 8. In the graphs in FIGS. 7 and 8, other measurement conditions are the same as those in FIGS. 5 and 6.

As shown in FIGS. 5 and 6, it is clear that, with the piezoelectric element 30 pertaining to this embodiment, the position at which the vibration amplitude of the panel 20 surface due to the vibration of the piezoelectric element 30 becomes the highest is located not directly above the piezoelectric element 30, but it is located in the center direction of the panel 20 in the longitudinal direction, offset from the installed position of the piezoelectric element 30. It should be noted, however, that, as shown in FIGS. 5 and 6, the absolute value of the vibration amplitude is lower than when the vibration amplitude becomes the highest at directly above the piezoelectric element 30. It is also clear that, with the piezoelectric element 30 pertaining to this embodiment, on the other hand, the difference between the highest value and lowest value of the vibration amplitude of the panel 20 (panel vibration amplitude) is smaller than those shown in FIGS. 7 and 8. In other words, controlling the input signals in a manner achieving sound pressure levels similar to those shown in FIGS. 7 and 8 will allow sound to generate over a wide range, without the sound generating points concentrating only in one area of the panel 20, which allows the entire panel to vibrate in a stable manner.

(Second Embodiment)

The electronic device pertaining to the second embodiment of the present invention is explained by referring to the drawings. FIG. 9 is a schematic top view of the electronic device, while FIG. 10 is a section view of the electronic device. The electronic device pertaining to this embodiment is different from the one in the first embodiment in that, as shown in FIGS. 9 and 10, an auxiliary member 40 is provided on the rear side of the panel 20. Since the remainder of the constitution is the same as in the first embodiment, only the difference is explained here.

The auxiliary member 40 is placed in a manner contacting both the side face of the piezoelectric element 30 and the interior face of the housing 10. Also, both ends of the auxiliary member 40 wrap around the piezoelectric element 30 and extend to its lateral side, with the entire auxiliary member 40 having roughly a U shape. The auxiliary member 40 is installed on the rear side of the panel 20 with adhesive, etc. Any material can be used for the auxiliary member 40. For example, preferably a flexible board or other printed wiring board is used for the auxiliary member 40, with wiring to connect the piezoelectric element 30 and a drive circuit (not illustrated) formed on the printed wiring board beforehand.

With the electronic device pertaining to this embodiment, preferably a step to install the auxiliary member 40 on the panel 20 is carried out prior to a step to install the piezoelectric element 30 on the panel 20. The reason is that, because the auxiliary member 40 is positioned closer than the piezoelectric element 30 to the end of the panel 20, the auxiliary member 40 can be installed at the specified position with high accuracy, and this in turn ensures accuracy of the installed position of the piezoelectric element 30. As described above, under the present invention the position relationship of the piezoelectric element 30 with respect to the housing 10 is important, and therefore installing this auxiliary member 40 is useful. Also, by installing the auxiliary member 40 on the rear side of the panel 20, it becomes easy to control the point at which the vibration amplitude of the panel 20 becomes the highest.

It should be noted that, while both side faces of the auxiliary member 40 are in contact with the piezoelectric element 30 and the interior face of the housing 10 in this embodiment, only one side face may be in contact or neither side face may be in contact. If the auxiliary member 40 does not contact the piezoelectric element 30, preferably when the wiring of the auxiliary member 40 is connected to the piezoelectric element 30, the position of the piezoelectric element 30 is determined by this wiring.

Also, in this embodiment, the bonding of the housing 10 and panel 20 permits variations like those described in the first embodiment.

The foregoing explained embodiments of the present invention in detail; however, the present invention is not limited to the foregoing. While only one piezoelectric element 30 is installed on the panel 20 in the aforementioned embodiments, two or more may be installed. If two piezoelectric elements 30 are installed, for example, preferably one piezoelectric element 30 is installed at the position described above, while the other piezoelectric element 30 is installed at a position symmetrical to the aforementioned piezoelectric element 30 with respect to the center point of the panel 20.

Also, while the aforementioned embodiments explained a smartphone as an example of electronic device, the invention pertaining to the present application for patent may be applied to various electronic devices including tablet terminals, notebook PCs, mobile phones, watches, photo stands, and remote controllers and operating controls for various equipment.

DESCRIPTION OF THE SYMBOLS

1—Electronic device, 10—Housing, 11—Bottom plate, 12—Frame, 20—Panel, 30—Piezoelectric element, 40—Auxiliary member.

What is claimed is:

1. An electronic device having:
   a planar panel functioning as a vibration plate,
   a housing that holds the planar panel at edges of the planar panel, and
   a piezoelectric element installed on a rear side face of the planar panel in a manner vibrating the planar panel by the piezoelectric element,
   wherein the piezoelectric element is installed at an installed position where vibration amplitude of the planar panel caused by the piezoelectric element is not a highest at the installed position but becomes a highest at a position between the installed position and a center of the planar panel in a longitudinal direction of the planar panel,
   wherein a longitudinal direction of the piezoelectric element is perpendicular to the longitudinal direction of the planar panel, and a distance measured in the longitudinal direction of the planar panel on a cross section, crossing the piezoelectric element, taken along the longitudinal direction of the planar panel between a part of the housing holding the edges of the planar panel, closest to a side face of the piezoelectric element, and the side face of the piezoelectric element, is not zero but is equal to or less than a width of the piezoelectric element.

2. The electronic device according to claim 1, wherein an auxiliary member is installed on the rear side face of the panel between the side face of the piezoelectric element and an interior face of the housing facing said side face.

3. The electronic device according to claim 2, wherein one side face of the auxiliary member is in contact with the interior face of the housing, and another side face of the auxiliary member is apart from the piezoelectric element.

4. The electronic device according to claim 2, wherein one side face of the auxiliary member is in contact with the interior face of the housing, and another side face of the auxiliary member is in contact with the side face of the piezoelectric element.

\* \* \* \* \*